April 20, 1965

E. L. PARR ETAL 3,179,447

LIMITED MOVEMENT HINGE CONNECTION

Filed June 27, 1960

INVENTORS
EDWARD L. PARR
BY JAMES M. VAN VECHTEN

ATTORNEY

April 20, 1965     E. L. PARR ETAL     3,179,447
LIMITED MOVEMENT HINGE CONNECTION
Filed June 27, 1960     2 Sheets-Sheet 2

INVENTORS
EDWARD L. PARR
BY JAMES M. VAN VECHTEN

ATTORNEY

United States Patent Office 3,179,447
Patented Apr. 20, 1965

3,179,447
LIMITED MOVEMENT HINGE CONNECTION
Edward L. Parr and James M. Van Vechten, El Cajon, Calif., assignors, by mesne assignments, to Fairchild Camera and Instrument Corporation, Syosset, N.Y., a corporation of Delaware
Filed June 27, 1960, Ser. No. 38,840
9 Claims. (Cl. 285—114)

The present invention relates to a low torque, flexible coupling, and more particularly to such a coupling which is effective to permit limited relative pivotal movement of a pair of hinge parts substantially about a fixed pivot point. The loads on the hinge parts are carried in such a way that the loads tend to assist pivotal movement rather than resist it.

According to the present invention, there are provided a pair of hinge parts which are connected together by a link or links. These links are elongated and are pivotally secured adjacent their ends to the pair of hinge parts by a pair of end pins. This arrangement permits relative pivotal movement of the hinge parts and the structures to which the hinge parts are fixedly secured. In addition, to insure that the relative pivotal movement of the hinge parts takes place about a substantially fixed center point, and to control the spacing between the hinge parts, a center pin or similar means is carried by the pair of hinge parts between the ends of the link or links, and this center pin is engageable with the pair of hinge parts in a manner which limits relative movement between the pair of hinge parts. By thus controlling the deflection of the hinge parts, the desired pivotal movement can be made to occur such that the load path of the ejection forces, that is the forces tending to move the hinge parts away from each other, is located to one side of the center pin. Such ejection forces then aid pivotal movement by reason of their off-center effect, akin to the forces on a tall column.

One application for the present invention which will be described to afford a better understanding of the function of the invention is the pivotal connection between the main body portion of a rocket and the exhaust nozzle portion of the rocket. As is well known, the exhaust nozzle portion of certain rockets is pivotable to thereby direct the stream of exhaust gases from the rocket nozzle along a predetermined axis which will steer the main body portion of the rocket in the direction desired. The pivotal connection between the main body portion and the exhaust nozzle portion of the rocket in one example is provided by a spherical projection from the main body portion of the rocket, which spherical projection is received within a spherical projection extending from the inner end of the nozzle portion of the rocket. Although the projections are described as spherical, the present invention is adapted to be used with various types of interacting projections.

The joint formed at the ball-sleeve connection is enclosed in a compartment formed by a flexible, or expansible and contractible member, such as a bellows or the like, which is connected between structures carried by the nozzle and main body of the rocket. This arrangement prevents the escape of gases which have leaked through the ball-sleeve connection, and since these gases are under comparatively high pressure differentials with respect to atmospheric pressure it will be apparent that the chamber formed by the bellows will be under considerable pressure. In addition, the action of ejected gases against the nozzle introduces ejection forces tending to move the hinge parts away from each other.

The high pressurization of a bellows presents a critical problem in that a bellows construction tends to become more and more rigid as the internal pressure increases, and it become increasingly difficult to deform the bellows to effect the desired pivotal movement described. However, the ejection forces just mentioned are utilized by the present invention to load the present coupling in an off-center manner to aid the desired pivotal movement and help to overcome the increasing rigidity of the bellows.

Heretofore, the primary support between the main body portion and the exhaust nozzle portion of the rocket was provided by a plurality of hinges, each of these hinges including a pair of arms which were pivotally secured at their inner ends. Their outer ends were rigidly connected, respectively, to the nozzle portion and main body portion of the rocket. With this arrangement, an undesirably high torque was required to effect pivotal movement.

Accordingly, the present invention provides a hinged connection between the rocket parts such that a plurality of link arms are provided, each connected at its ends to the rocket parts. Since each link arm does not pivot at its middle, the spacing between the rocket parts is better controlled during pivotal movement thereof, and the manner of deformation of the bellows is better controlled. More particularly, a plurality of couplings are fixedly connected between the nozzle portion and the main body portion of the rocket. Each of the couplings includes a pair of hinge parts which are pivotally secured together by one or more of the link arms just mentioned, and the arms are held in position by a pair of end pins. This arrangement provides free pivotal movement between the nozzle and the main body of the rocket. Unlimited transverse movement of the hinge parts, that is, movement other than pivotal, is prevented by a center pin or similar means.

In one embodiment of the present invention a pair of spaced apart, elongated links are employed to connect together the hinge parts, these links being pivotally secured together at their ends by a pair of end pins. These end pins are disposed through the hinge parts, one pin through each hinge part, and the hinge parts are located in the space between the elongated links. A center pin is disposed through the hinge parts along an axis parallel to and between the axes of the two end pins, and one of the openings in the pair of hinge parts through which the center pin is disposed is made oversize to permit limited relative movement between the hinge parts, the center pin establishing a substantially fixed point of pivotal rotation for the hinge parts.

In another and preferred embodiment of the invention each of the hinge parts includes spaced apart side sections, and an elongated link is disposed in the space between the spaced apart side sections and is pivotally secured adjacent its ends to the pair of hinge parts by a pair of end pins. A center pin is disposed through the side sections of the hinge parts along an axis intermediate the axes of the two end pins, and this center pin is carried within an oversize opening provided in the link. In addition, the openings for the center pin in one of the hinge parts is made oversize to permit relative pivotal movement between the hinge parts. The size of the opening in the link in this embodiment dictates the extent of relative pivotal movement which is permitted. In one rocket nozzle application, for example, this relative pivotal movement is approximately 7 degrees on either side of a line passing through the center points of the center pin and the two end pins when these pins are aligned.

With this arrangement the ejection or separation forces on the coupling and bellows acts along a load path which is to one side of the bellows center line, and tends to aid bellows deflection and pivoting of the hinge parts. By adjusting the distance between the end pins, such as by placing them farther apart, this aid to pivotal movement can be increased as desired.

Other objects and features of the present invention will be readily apparent to those skilled in the art from the following specification and appended drawings wherein is illustrated a preferred form of the invention, and in which.

Figure 1:
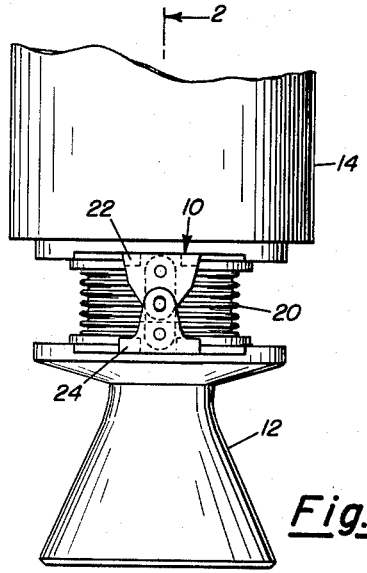
FIGURE 1 is a side elevational view of a rocket nozzle pivotally secured to the main body portion of a rocket by a pair of couplings according to the present invention, only one of such couplings being illustrated.
Figure 2:
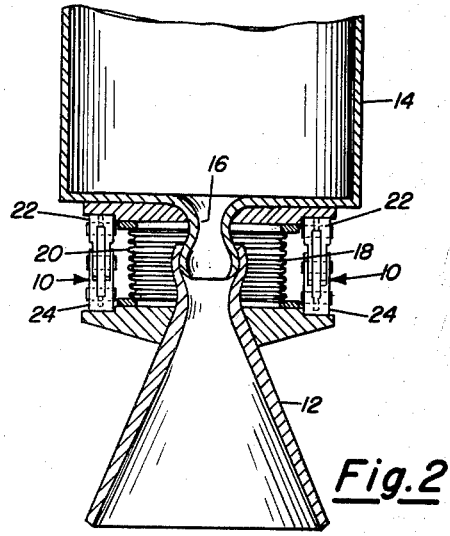
FIGURE 2 is a view taken along line 2—2 of FIGURE 1, the pair of couplings being illustrated in full lines for simplicity.

Referring now to the drawings, and particularly to FIGURES 1 and 2, there is illustrated a pair of low torque, flexible couplings 10 which are employed to provide a pivotal connection between the exhaust nozzle portion 12 and the main body portion 14 of a rocket. It will be understood of course that the description herein of a pivotal connection of portions of a rocket engine is merely exemplary, and the present coupling 10 is readily adapted to other applications wherein a pivotal connection is desired which affords pivotal movement about a substantially fixed pivot point or axis.

As best illustrated in FIGURE 2, portions 12 and 14 of the rocket engine are pivotally secured together by a ball joint formed by a rearward projection 16 of portion 14, and by a forward projection 18 of nozzle portion 12. Projections 16 and 18 have mating surfaces which are generally spherical to reduce to a minimum the torque necessary to effect relative pivotal movement between portions 12 and 14. It is an important feature of the present invention that this low torque at the ball joint is not appreciably increased by the pivotal connections provided by couplings 10. That is, couplings 10 are so constructed that their action in supporting nozzle portion 12 from portion 14, and also providing relative pivotal movement therebetween, does not materially increase the torque necessary to effect the described relative pivotal movement between portions 12 and 14.

An expansible and contractible member, such as a bellows 20, is arranged to completely surround the ball joint between projections 16 and 18, bellows 20 being secured at its ends to main body portion 14 and nozzle portion 12. Portions 12 and 14 are provided with intercommunicating passageways for the ejection of the hot, highly pressurized gases of combustion. As these gases pass through the fluid passageways, leakage occurs in the ball joint connecting portions 12 and 14, and these leaking gases place bellows 12 under a comparatively high internal pressure. This pressure is sufficiently great that bellows 20 tends to oppose relative pivotal movement between portions 12 and 14, that is, bellows 20 resists the compression on one side and extension on the other side of the bellows which is required to permit such relative pivotal movement.

With the present couplings 10, this tendency of bellows 20 to rigidity is offset by the forces tending to move couplings 10 apart. That is, these ejection forces are assumed by couplings 10 along an axis to one side of the centerline of the bellows so that such forces aid deflection of bellows 20 in spite of their high internal pressures. Further, the internal pressures of the bellows acts to outwardly deflect the bellows to aid the desired pivotal movement.

Figure 5:
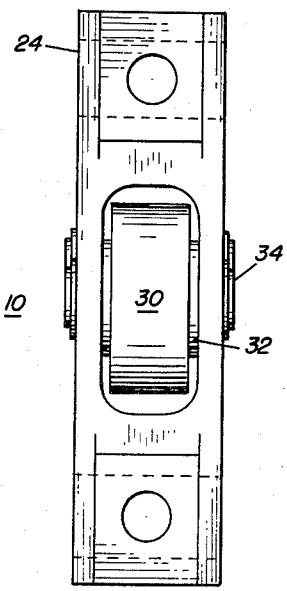
FIGURE 5 is a view taken along line 5—5 of FIGURE 3.
Figure 3:
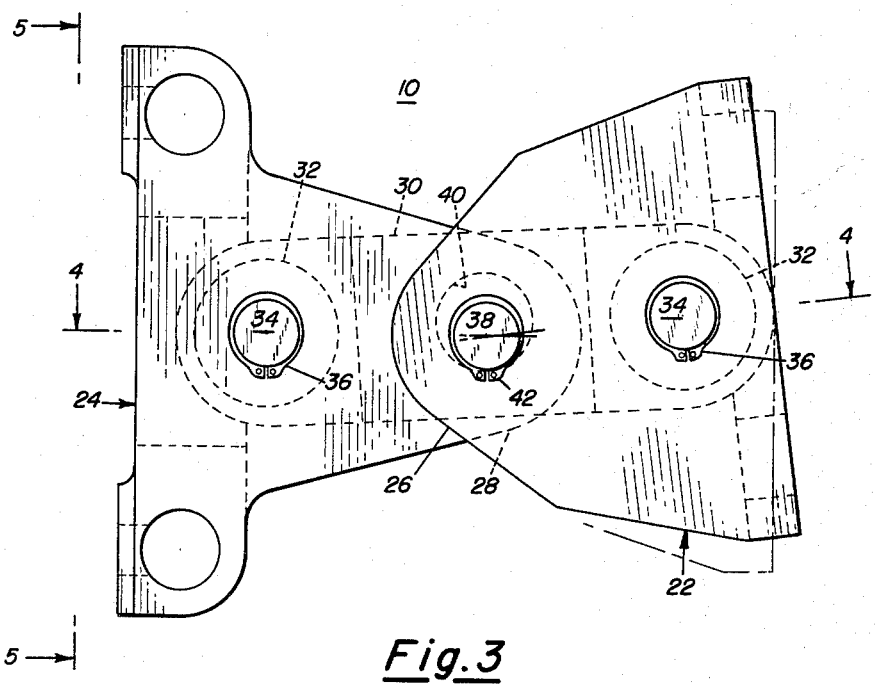
FIGURE 3 is an enlarged elevational view of a coupling according to the invention.
Figure 4:
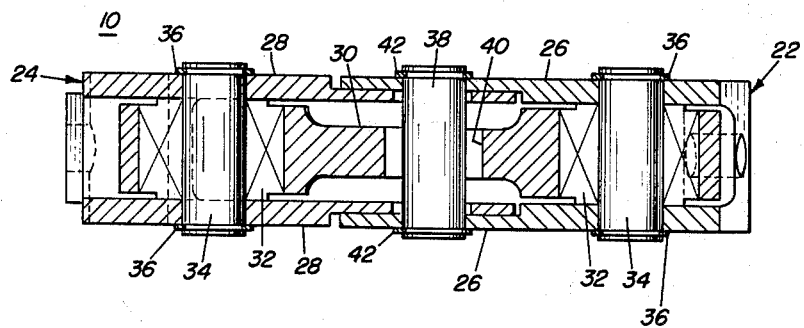
FIGURE 4 is a view taken along line 4—4 of FIGURE 3.

Referring now to FIGURES 3 through 5, each coupling 10 comprises a pair of hinged parts 22 and 24, hinge part 22 being fixedly connected to main body portion 14, and hinge part 24 being fixedly connected to a bracket which is rigidly secured to nozzle portion 12. The form of fixed connections of hinge parts 22 and 24 to portions 12 and 14 are not important to the present invention; any suitable means for accomplishing a rigid connection being satisfactory.

Hinge part 22 includes a pair of spaced apart, inwardly extending legs or side sections 26, and hinge part 24 similarly includes a pair of spaced apart, inwardly extending legs or side sections 28, sections 26 and 28 overlapping as illustrated.

A link 30 is arranged in the space formed between side sections 26 and 28 and extends throughout substantially the whole length of this space. At its two ends link 30 is provided with a pair of bushings 32, and a pair of laterally or transversely extending elements or end pins 34 are disposed through the central bores of bushings 32 and through side sections 26 and 28 of hinge parts 22 and 24. End pins 34 are closely received within hinge parts 22 and 24 and link 30 so that relative pivotal movement is permitted, but movement other than pivotal movement including longitudinal movement is substantially prevented. End pins 34 are maintained in position by a plurality of usual lock rings 36 held within peripheral grooves provided in the ends of end pins 34.

With this arrangement, link 30 is pivotable relative to hinge part 22 and relative to hinge part 24, and hinge parts 22 and 24 are movable relative to each other by reason of their interconnection by link 30. More particularly, hinge parts 22 and 24 are relatively pivotal, and are adapted to move transversely relative to each other, this transverse movement being limited by link 30, as will be seen.

A transversely or laterally extending element or center pin 38 is closely received within suitable aligned openings provided in side sections 26, center pin 38 being loosely received within oversize openings provided in side sections 28, center pin 38 being disposed through an oversize opening 40 provided in link 30. Center pin 38 is maintained in position by usual lock rings 42.

The oversize openings in sections 28 permit relative pivotal movement between hinge parts 22 and 24, allowing a relative travel of pin 38 with respect to sections 28 of approximately fifteen thousandths of an inch in the present invention. Thus the walls forming the oversize opening together with the pin 38 provide a connection, having lost motion, between the hinge parts. This distance is not critical, and could be much greater if desired, so long as relative pivotal movement is permitted between parts 22 and 24. Opening 40 in this embodiment determines the extent of pivotal movement permitted between parts 22 and 24. That is, opening 40 is made large enough so that parts 22 and 24 may pivot through the arc desired before the periphery of pin 38 comes into engagement with the inner margins of opening 40.

Thus it is seen that hinge parts 22 and 24 are freely pivotable with respect to each other, and a limited amount of relative transverse movement between parts 22 and 24 is provided to reduce the deflection of bellows 20, but this transverse movement is limited by the engagement of center pin 38 with link 30 prior to the time when the transverse movement is so appreciable that undue binding or frictional engagement is encountered at the ball joint between projections 16 and 18 of rocket engine portions 12 and 14. Actual tests have shown that the bellows deflection torques for the various positions of relative pivotal movement between parts 22 and 24 are substantially less than couplings of the prior art which have been designed for this same purpose.

Figure 6:
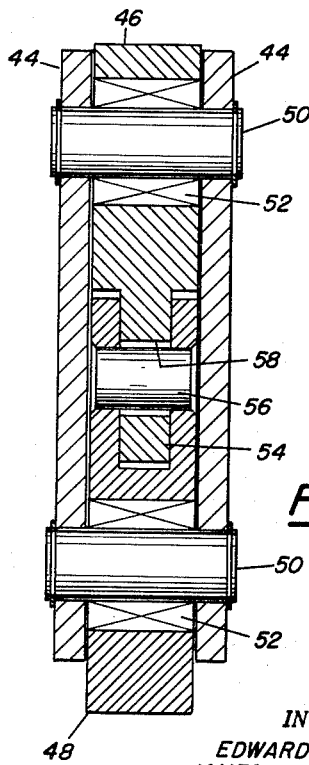
FIGURE 6 is a cross sectional view similar to FIGURE 4, but illustrating another embodiment of the present invention.

Referring now to FIGURE 6, there is illustrated another embodiment of the present invention wherein a pair of elongated links 44 are employed, links 44 in this case being spaced apart and the pair of hinge parts 46 and 48 being received in the space between links 44.

Links 44 are pivotally secured to hinge parts 46 and 48 by a pair of end pins 50 which are closely received within suitable openings in links 44 and in a pair of bushings 52 carried by hinge parts 46 and 48, respectively. Relative pivotal and transverse movement is thus provided between links 44 and hinge parts 46 and 48, although it is noted that only pivotal movement is provided about the pins 50.

Hinge part 46 includes a projection 54 which is received within a slot formed in hinge part 48, and a center pin 56 is laterally or transversely disposed through suitably aligned openings provided in projection 54 and in the adjacent portions of hinge part 48. Center pin 56 is closely received within the openings in hinge part 48, but is loosely received within the oversize opening 58 in projection 54. The oversize opening 58 permits pivotal movement to occur between hinge parts 46 and 48, and also permits a limited amount of relative transverse movement between these parts. However the amount of such transverse movement is limited by reason of the size of opening 58. That is, the periphery of center pin 56 will engage the inner margins of opening 58 to stop further relative movement between parts 46 and 48.

Referring to FIGURE 3, when hinge parts 22 and 24 are pivoted into the full line position illustrated, an imaginary line (not shown) connecting the centers of end pins 34 is located to one side of the center of pin 38. This imaginary line represents the load path of the ejection forces tending to move parts 22 and 24 apart. Next, an imaginary line drawn through the centers of all three pins 34 and 38 will approximate the center line arc of the deformed bellows. Since the load line is to one side of this bellows center line arc, it will be seen that the ejection or separation forces tend to aid the deflection of the bellows, thereby desirably reducing the torque necessary to effect such deflection.

While certain preferred embodiments of the invention have been specifically disclosed, it is understood that the invention is not limited thereto as many variations will be readily apparent to those skilled in the art and the invention is to be given its broadest possible interpretation within the terms of the following claims.

We claim:
1. In a device of the kind described, in combination:
 (A) Two elements which are movable relative to one another;
 (B) a low torque, flexible coupling for connecting said elements with one another, comprising:
  (1) a pair of elongated hinge parts, one end of one of said hinge parts being fixed to one of said elements, and one end of the other of said hinge parts being fixed to the other of said elements;
  (2) elongated link means;
  (3) means for pivotally connecting one end of the link means with one of the pair of hinge parts intermediate the ends thereof;
  (4) means for pivotally connecting the opposite end of the link means to the other of said part of hinge parts intermediate the ends thereof, said link means and said first and second mentioned pivot means preventing longitudinal movement of said hinge parts relative to one another;
  (5) and means forming a lost motion connection between those ends of the hinge parts which are opposite the ends which are connected, respectively, with said elements.

2. A combination according to claim 1 and characterized in that said last-mentioned means is a pin disposed through said pair of hinge parts and having clearance with at least one of said hinge parts.

3. A combination according to claim 1 and characterized in that said last-mentioned means is a pin disposed through openings therefor in said pair of hinge parts and in that said openings are formed to closely receive said pin within one of said pair of hinge parts to constrain said pin against any relative movement other than pivotal movement with respect to said one of said pair of hinge parts, and to loosely receive said pin within the other of said pair of hinge parts.

4. A combination as defined in claim 3, characterized in that said link means is provided with an opening and that said pin extends through the opening, said opening being of larger diameter than the pin to form a lost motion clearance between the wall thereof and the pin.

5. A combination as defined in claim 1, characterized in that the link means comprised two parallelly disposed links; that said opposite ends of the hinge parts are disposed between said links; and that said means forming a lost motion connection is disposed between said links.

6. A combination as defined in claim 5, characterized in that said means forming the lost motion connection comprises a pin associated with said opposite ends of both of said hinge parts, at least one of said parts having an opening therein for receiving the pin and said opening being of larger diameter than the pin forming a lost motion clearance between the walls of said opening and the pin thereby.

7. A combination as defined in claim 1, characterized to including means forming a direct pivotal connection between said elements; and flexible sealing means surrounding last mentioned pivotal connection.

8. A combination as defined in claim 4, characterized to including means forming a direct pivotal connection between said elements; and flexible sealing means surrounding last mentioned pivotal connection.

9. A combination as defined in claim 5, characterized to including means forming a direct pivotal connection between said elements; and flexible sealing means surrounding last mentioned pivotal connection.

References Cited by the Examiner

UNITED STATES PATENTS

| | | | |
|---|---|---|---|
| 1,266,572 | 5/18 | Fisher | 74—250 |
| 1,953,388 | 4/34 | Bettin | 74—250 |
| 2,374,267 | 4/45 | Berg | 74—250 |
| 2,590,392 | 3/52 | Feilden | 285—226 |
| 2,904,356 | 9/59 | Love | 285—226 |

FOREIGN PATENTS

| | | |
|---|---|---|
| 181,531 | 6/22 | Great Britain. |
| 658,066 | 1/29 | France. |
| 556,857 | 10/43 | Great Britain. |
| 983,542 | 2/51 | France. |
| 695,015 | 8/53 | Great Britain. |

CARL W. TOMLIN, *Primary Examiner.*